(12) United States Patent
Quanci et al.

(10) Patent No.: US 9,273,249 B2
(45) Date of Patent: Mar. 1, 2016

(54) SYSTEMS AND METHODS FOR CONTROLLING AIR DISTRIBUTION IN A COKE OVEN

(71) Applicant: SunCoke Technology and Development LLC., Lisle, IL (US)

(72) Inventors: John Francis Quanci, Haddonfield, NJ (US); Mark Anthony Ball, Richlands, VA (US); Chun Wai Choi, Chicago, IL (US); Rajat Kapoor, Naperville, IL (US)

(73) Assignee: SunCoke Technology and Development LLC., Lisle, IL (US)

( * ) Notice: Subject to any disclaimer, the term of this patent is extended or adjusted under 35 U.S.C. 154(b) by 490 days.

(21) Appl. No.: 13/730,735

(22) Filed: Dec. 28, 2012

(65) Prior Publication Data

US 2014/0183023 A1 Jul. 3, 2014

(51) Int. Cl.
*C10B 15/02* (2006.01)
*C10B 21/10* (2006.01)
(Continued)

(52) U.S. Cl.
CPC ............... *C10B 15/02* (2013.01); *C10B 21/10* (2013.01); *C10B 15/00* (2013.01); *C10B 49/02* (2013.01); *F23C 7/00* (2013.01); *F23C 7/06* (2013.01); *F23C 7/08* (2013.01); *F23L 2900/15043* (2013.01); *Y02P 20/129* (2015.11); *Y10S 122/03* (2013.01); *Y10S 165/034* (2013.01)

(58) Field of Classification Search
CPC .............. C10B 5/10; C10B 5/12; C10B 5/14; C10B 5/16; C10B 5/18; C10B 5/20; C10B 21/10; C10B 15/00; C10B 15/02; C10B 49/02; F23L 2900/15043; F23C 7/00; F23C 7/008; F23C 7/06; Y10S 122/03; Y10S 165/034

See application file for complete search history.

(56) References Cited

U.S. PATENT DOCUMENTS 469,868 A 3/1892 Thomas et al.
1,140,798 A 5/1915 Carpenter
(Continued)

FOREIGN PATENT DOCUMENTS

CA 2775992 A1 5/2011
CA 2822857 A1 7/2012
(Continued)

OTHER PUBLICATIONS

International Search Report and Written Opinion of International Application No. PCT/US2012/072173; Date of Mailing: Sep. 26, 2013; 10 pages.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
(Continued)

*Primary Examiner* — In Suk Bullock
*Assistant Examiner* — Jonathan Pilcher
(74) *Attorney, Agent, or Firm* — Perkins Coie LLP

(57) ABSTRACT

The present technology is generally directed to systems and methods for controlling air distribution in a coke oven. In a particular embodiment, a coke oven air distribution system comprises an oven chamber having an oven floor configured to support a coal bed, a plurality of sidewalls extending upward from the oven floor, and an oven crown covering a top portion of the oven chamber. The air distribution system further includes an air inlet positioned above the oven floor and a distributor proximate to the inlet. The inlet is configured to introduce air into the oven chamber and the distributor is configured to at least one of preheat, redirect, or spread air within the oven chamber.

21 Claims, 12 Drawing Sheets

(51) Int. Cl.
　　　C10B 49/02　　　(2006.01)
　　　F23C 7/00　　　(2006.01)
　　　F23C 7/08　　　(2006.01)
　　　F23C 7/06　　　(2006.01)
　　　C10B 15/00　　　(2006.01)

(56) References Cited

U.S. PATENT DOCUMENTS

| | | |
|---|---|---|
| 1,424,777 A | 8/1922 | Schondeling |
| 1,430,027 A | 9/1922 | Piantinga |
| 1,486,401 A | 3/1924 | Van Ackeren |
| 1,572,391 A | 2/1926 | Klaiber |
| 1,721,813 A | 7/1929 | Geipert et al. |
| 1,818,370 A | 8/1931 | Wine |
| 1,848,818 A | 3/1932 | Becker |
| 1,955,962 A | 4/1934 | Jones |
| 2,394,173 A | 2/1946 | Harris et al. |
| 2,424,012 A | 7/1947 | Bangham et al. |
| 2,902,991 A | 9/1959 | Whitman |
| 3,033,764 A | 5/1962 | Hannes |
| 3,462,345 A | 8/1969 | Keman |
| 3,545,470 A | 12/1970 | Paton |
| 3,616,408 A | 10/1971 | Hickam |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,836,161 A | 9/1974 | Buhl |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve et al. |
| 3,876,506 A | 4/1975 | Dix et al. |
| 3,878,053 A | 4/1975 | Hyde |
| 3,897,312 A | 7/1975 | Armour et al. |
| 3,906,992 A | 9/1975 | Leach |
| 3,912,091 A | 10/1975 | Thompson |
| 3,917,458 A | 11/1975 | Polak |
| 3,930,961 A | 1/1976 | Sustarsic et al. |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach et al. |
| 3,984,289 A | 10/1976 | Sustarsic et al. |
| 4,004,702 A | 1/1977 | Szendroi |
| 4,004,983 A | 1/1977 | Pries |
| 4,040,910 A | 8/1977 | Knappstein et al. |
| 4,059,885 A | 11/1977 | Oldengott |
| 4,067,462 A | 1/1978 | Thompson |
| 4,083,753 A | 4/1978 | Rogers et al. |
| 4,086,231 A | 4/1978 | Ikio |
| 4,100,033 A | 7/1978 | Holter |
| 4,111,757 A | 9/1978 | Ciarimboli |
| 4,124,450 A | 11/1978 | MacDonald |
| 4,141,796 A | 2/1979 | Clark et al. |
| 4,145,195 A | 3/1979 | Knappstein et al. |
| 4,147,230 A | 4/1979 | Ormond et al. |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy et al. |
| 4,213,489 A | 7/1980 | Cain |
| 4,213,828 A | 7/1980 | Calderon |
| 4,222,748 A | 9/1980 | Argo et al. |
| 4,222,824 A * | 9/1980 | Flockenhaus et al. ......... 201/41 |
| 4,224,109 A * | 9/1980 | Flockenhaus .................. 201/41 |
| 4,225,393 A | 9/1980 | Gregor et al. |
| 4,235,830 A | 11/1980 | Bennett et al. |
| 4,248,671 A | 2/1981 | Belding |
| 4,249,997 A | 2/1981 | Schmitz |
| 4,263,099 A | 4/1981 | Porter |
| 4,285,772 A | 8/1981 | Kress |
| 4,287,024 A | 9/1981 | Thompson |
| 4,289,584 A | 9/1981 | Chuss et al. |
| 4,289,585 A | 9/1981 | Wagener et al. |
| 4,303,615 A | 12/1981 | Jarmell et al. |
| 4,307,673 A | 12/1981 | Caughey |
| 4,314,787 A | 2/1982 | Kwasnik et al. |
| 4,330,372 A | 5/1982 | Cairns et al. |
| 4,334,963 A | 6/1982 | Stog |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,366,029 A | 12/1982 | Bixby et al. |
| 4,373,244 A | 2/1983 | Mertens et al. |
| 4,375,388 A | 3/1983 | Hara et al. |
| 4,391,674 A | 7/1983 | Velmin et al. |
| 4,392,824 A | 7/1983 | Struck et al. |
| 4,395,269 A | 7/1983 | Schuler |
| 4,396,394 A | 8/1983 | Li et al. |
| 4,396,461 A | 8/1983 | Neubaum et al. |
| 4,431,484 A | 2/1984 | Weber et al. |
| 4,439,277 A | 3/1984 | Dix |
| 4,445,977 A | 5/1984 | Husher |
| 4,446,018 A | 5/1984 | Cerwick |
| 4,448,541 A | 5/1984 | Wirtschafter |
| 4,452,749 A | 6/1984 | Kolvek et al. |
| 4,459,103 A | 7/1984 | Gieskieng |
| 4,469,446 A | 9/1984 | Goodboy |
| 4,498,786 A | 2/1985 | Ruscheweyh |
| 4,508,539 A | 4/1985 | Nakai |
| 4,527,488 A | 7/1985 | Lindgren |
| 4,568,426 A | 2/1986 | Orlando et al. |
| 4,570,670 A | 2/1986 | Johnson |
| 4,614,567 A | 9/1986 | Stahlherm et al. |
| 4,645,513 A | 2/1987 | Kubota et al. |
| 4,655,193 A | 4/1987 | Blacket |
| 4,655,804 A | 4/1987 | Kercheval et al. |
| 4,680,167 A | 7/1987 | Orlando et al. |
| 4,704,195 A | 11/1987 | Janicka et al. |
| 4,720,262 A | 1/1988 | Durr et al. |
| 4,726,465 A | 2/1988 | Kwasnik et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,114,542 A * | 5/1992 | Childress et al. ............... 201/15 |
| 5,228,955 A | 7/1993 | Westbrook, III |
| 5,318,671 A | 6/1994 | Pruitt |
| 5,447,606 A | 9/1995 | Prutt et al. |
| 5,480,594 A * | 1/1996 | Wilkerson et al. ............ 261/109 |
| 5,670,025 A | 9/1997 | Baird |
| 5,928,476 A | 7/1999 | Daniels |
| 5,968,320 A | 10/1999 | Sprague |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,187,148 B1 | 2/2001 | Sturgulewski |
| 6,189,819 B1 | 2/2001 | Racine |
| 6,290,494 B1 | 9/2001 | Barkdoll |
| 6,596,128 B2 | 7/2003 | Westbrook |
| 6,626,984 B1 | 9/2003 | Taylor |
| 6,699,035 B2 | 3/2004 | Brooker |
| 6,758,875 B2 | 7/2004 | Reid et al. |
| 6,907,895 B2 | 6/2005 | Johnson et al. |
| 6,946,011 B2 | 9/2005 | Snyder |
| 7,056,390 B2 | 6/2006 | Fratello et al. |
| 7,077,892 B2 | 7/2006 | Lee |
| 7,314,060 B2 | 1/2008 | Chen et al. |
| 7,331,298 B2 | 2/2008 | Taylor et al. |
| 7,497,930 B2 | 3/2009 | Barkdoll et al. |
| 7,611,609 B1 | 11/2009 | Valia et al. |
| 7,644,711 B2 | 1/2010 | Creel |
| 7,727,307 B2 | 6/2010 | Winkler |
| 7,803,627 B2 | 9/2010 | Hodges |
| 7,827,689 B2 | 11/2010 | Crane et al. |

(56) References Cited

U.S. PATENT DOCUMENTS

| | | | |
|---|---|---|---|
| 7,998,316 | B2 | 8/2011 | Barkdoll et al. |
| 8,071,060 | B2 | 12/2011 | Ukai et al. |
| 8,079,751 | B2 | 12/2011 | Kapila et al. |
| 8,152,970 | B2 | 4/2012 | Barkdoll et al. |
| 8,236,142 | B2 | 8/2012 | Westbrook et al. |
| 8,266,853 | B2 | 9/2012 | Bloom et al. |
| 8,398,935 | B2 | 3/2013 | Howell, Jr. et al. |
| 2006/0102420 | A1 | 5/2006 | Huber et al. |
| 2008/0169578 | A1 | 7/2008 | Crane et al. |
| 2008/0179165 | A1 | 7/2008 | Chen et al. |
| 2008/0271985 | A1 | 11/2008 | Yamasaki |
| 2009/0152092 | A1* | 6/2009 | Kim et al. .................. 201/27 |
| 2009/0217576 | A1 | 9/2009 | Kim et al. |
| 2009/0283395 | A1 | 11/2009 | Hippe |
| 2010/0095521 | A1 | 4/2010 | Bertini et al. |
| 2010/0115912 | A1 | 5/2010 | Worley et al. |
| 2010/0287871 | A1 | 11/2010 | Bloom et al. |
| 2010/0300867 | A1* | 12/2010 | Kim et al. .................. 201/37 |
| 2011/0048917 | A1 | 3/2011 | Kim et al. |
| 2011/0120852 | A1* | 5/2011 | Kim .................. 201/16 |
| 2011/0192395 | A1* | 8/2011 | Kim .................. 126/85 R |
| 2011/0223088 | A1 | 9/2011 | Chang et al. |
| 2011/0253521 | A1 | 10/2011 | Kim |
| 2011/0315538 | A1* | 12/2011 | Kim et al. .................. 201/37 |
| 2012/0024688 | A1 | 2/2012 | Barkdoll |
| 2012/0030998 | A1 | 2/2012 | Barkdoll et al. |
| 2012/0152720 | A1 | 6/2012 | Reichelt et al. |
| 2012/0228115 | A1 | 9/2012 | Westbrook |
| 2012/0305380 | A1* | 12/2012 | Wang et al. .................. 201/25 |
| 2013/0216717 | A1 | 8/2013 | Rego et al. |
| 2013/0306462 | A1 | 11/2013 | Kim et al. |
| 2014/0033917 | A1 | 2/2014 | Rodgers et al. |
| 2014/0048402 | A1 | 2/2014 | Quanci et al. |
| 2014/0048404 | A1 | 2/2014 | Quanci et al. |
| 2014/0048405 | A1 | 2/2014 | Quanci et al. |
| 2014/0061018 | A1 | 3/2014 | Sarpen et al. |
| 2014/0083836 | A1 | 3/2014 | Quanci et al. |
| 2014/0182195 | A1 | 7/2014 | Quanci et al. |
| 2014/0182683 | A1 | 7/2014 | Quanci et al. |
| 2014/0183024 | A1 | 7/2014 | Chun et al. |
| 2014/0183026 | A1 | 7/2014 | Quanci et al. |
| 2014/0262139 | A1 | 9/2014 | Choi et al. |
| 2014/0262726 | A1 | 9/2014 | West et al. |
| 2015/0122629 | A1 | 5/2015 | Freimuth et al. |
| 2015/0247092 | A1 | 9/2015 | Quanci et al. |
| 2015/0287026 | A1 | 10/2015 | Yang et al. |

FOREIGN PATENT DOCUMENTS

| | | |
|---|---|---|
| CN | 2064363 U | 10/1990 |
| CN | 1092457 A | 9/1994 |
| CN | 1255528 A | 6/2000 |
| CN | 1358822 A | 7/2002 |
| CN | 2509188 Y | 9/2002 |
| CN | 2528771 Y | 1/2003 |
| CN | 1468364 A | 1/2004 |
| CN | 2668641 Y | 1/2005 |
| CN | 202226816 U | 5/2012 |
| DE | 212176 C | 7/1909 |
| DE | 3315738 A1 | 11/1983 |
| DE | 3231697 C1 | 1/1984 |
| DE | 3329367 C1 | 11/1984 |
| DE | 19545736 A1 | 6/1997 |
| DE | 19803455 C1 | 8/1999 |
| DE | 10154785 A1 | 5/2003 |
| DE | 102009031436 A1 | 1/2011 |
| DE | 102011052785 B3 | 12/2012 |
| FR | 2339664 A1 | 8/1977 |
| GB | 441784 A | 1/1936 |
| GB | 606340 A | 8/1948 |
| GB | 611524 A | 11/1948 |
| GB | 725865 A | 3/1955 |
| GB | 871094 A | 6/1961 |
| JP | 50148405 A | 11/1975 |
| JP | 54054101 A | 4/1979 |
| JP | 57051786 A | 3/1982 |
| JP | 57051787 A | 3/1982 |
| JP | 57083585 A | 5/1982 |
| JP | 57090092 A | 6/1982 |
| JP | 58091788 A | 5/1983 |
| JP | 59051978 A | 3/1984 |
| JP | 59053589 A | 3/1984 |
| JP | 59071388 A | 4/1984 |
| JP | 59108083 A | 6/1984 |
| JP | 59145281 A | 8/1984 |
| JP | 60004588 A | 1/1985 |
| JP | 61106690 A | 5/1986 |
| JP | 62011794 A | 1/1987 |
| JP | 62285980 | 12/1987 |
| JP | S-62285980 A | 12/1987 |
| JP | 01103694 A | 4/1989 |
| JP | 01249886 A | 10/1989 |
| JP | H0319127 | 1/1991 |
| JP | 07188668 | 7/1995 |
| JP | 07216357 | 8/1995 |
| JP | 08127778 A | 5/1996 |
| JP | 2001200258 A | 7/2001 |
| JP | 03197588 B2 | 8/2001 |
| JP | 2002106941 A | 4/2002 |
| JP | 200341258 A | 2/2003 |
| JP | 2003071313 A | 3/2003 |
| JP | 04159392 B2 | 10/2008 |
| JP | 2009144121 A | 7/2009 |
| JP | 2012102302 A | 5/2012 |
| KR | 960008754 Y1 | 10/1996 |
| KR | 20000012393 A | 3/2000 |
| KR | 10-0797852 | 1/2008 |
| KR | 10-2011-0010452 A | 2/2011 |
| KR | 10-0296700 B1 | 10/2011 |
| KR | 101318388 B1 | 10/2013 |
| WO | WO-9012074 A1 | 10/1990 |
| WO | WO-9945083 A1 | 9/1999 |
| WO | WO-2007103649 A2 | 9/2007 |
| WO | WO-2008034424 A1 | 3/2008 |
| WO | WO-2010107513 A1 | 9/2010 |
| WO | 2011000447 A1 | 1/2011 |
| WO | WO-2012029979 A1 | 3/2012 |
| WO | 2013023872 A1 | 2/2013 |

OTHER PUBLICATIONS

Diez, et al., "Coal for Metallurgical Coke Production: Predictions of Coke Quality and Future Requirements for Cokemaking", International Journal of Coal Geology, 2002, vol. 50, Issue 1-4, pp. 389-412.

JP 03-197588, Inoqu Keizo et al., Method and Equipment for Boring Degassing Hole in Coal Charge in Coke Oven, Japanese Patent (Abstract Only) Aug. 28, 1991.

JP 04-159392, Inoue Keizo et al., Method and Equipment for Opening Hole for Degassing of Coal Charge in Coke Oven, Japanese Patent (Abstract Only) Jun. 2, 1992.

ASTM D5341-99(2010)e1, Standard Test Method for Measuring Coke Reactivity Index (CRI) and Coke Strength After Reaction (CSR), ASTM International, West Conshohocken, PA, 2010.

Clean coke process: process development studies by USS Engineers and Consultants, Inc., Wisconsin Tech Search, request date Oct. 5, 2011, 17 pages.

Rose, Harold J., "The Selection of Coals for the Manufacture of Coke," American Institute of Mining and Metallurgical Engineers, Feb. 1926, 8 pages.

U.S. Appl. No. 14/655,003, filed Jun. 23, 2015, Ball, Mark A., et al.
U.S. Appl. No. 14/655,013, filed Jun. 23, 2015, West, Gary D., et al.
U.S. Appl. No. 14/655,204, filed Jun. 24, 2015, Quanci, John F., et al.
U.S. Appl. No. 14/839,384, filed Aug. 28, 2015, Quanci, John F., et al.
U.S. Appl. No. 14/839,493, filed Aug. 28, 2015, Quanci, John F., et al.
U.S. Appl. No. 14/839,551, filed Aug. 28, 2015, Quanci, John F., et al.
U.S. Appl. No. 14/839,588, filed Aug. 28, 2015, Quanci, John F., et al.
U.S. Appl. No. 14/865,581, filed Sep. 25, 2015, Sarpen, Jacob P., et al.

* cited by examiner

SYSTEMS AND METHODS FOR CONTROLLING AIR DISTRIBUTION IN A COKE OVEN

TECHNICAL FIELD

The present technology is generally directed to systems and methods for controlling air distribution in a coke oven.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for 24 to 48 hours under closely-controlled atmospheric conditions. Coking ovens have been used for many years to covert coal into metallurgical coke. During the coking process, finely crushed coal is heated under controlled temperature conditions to devolatilize the coal and form a fused mass of coke having a predetermined porosity and strength. Because the production of coke is a batch process, multiple coke ovens are operated simultaneously.

Coal particles or a blend of coal particles are charged into hot ovens, and the coal is heated in the ovens in order to remove volatile matter ("VM") from the resulting coke. Horizontal Heat Recovery (HHR) ovens operate under negative pressure and are typically constructed of refractory bricks and other materials, creating a substantially airtight environment. The negative pressure ovens draw in air from outside the oven to oxidize the coal's VM and to release the heat of combustion within the oven.

In some arrangements, air is introduced to the oven through damper ports or apertures in the oven sidewall, door, or crown to the region above the coal-bed (called the crown region). In the crown region the air combusts with the VM gases evolving from the pyrolysis of the coal. However, the buoyancy effect acting on the cold air entering the oven chamber can lead to coal burnout and loss in yield productivity. More specifically, the cold, dense air entering the oven falls towards the hot coal surface. Before the air can warm, rise, combust with volatile matter, and/or disperse and mix in the oven, it creates a burn loss on the coal surface. Accordingly, there exists a need to improve combustion efficiency in coke ovens.

DETAILED DESCRIPTION

The present technology is generally directed to systems and methods for controlling air distribution in a coke oven. In a particular embodiment, a coke oven air distribution system comprises an oven chamber having an oven floor configured to support a coal bed, a plurality of sidewalls extending upward from the oven floor, and an oven crown covering a top portion of the oven chamber. The air distribution system further includes an air inlet positioned above the oven floor and a distributor proximate to the inlet. The inlet is configured to introduce air into the oven chamber and the distributor is configured to at least one of preheat, redirect, recirculate, or spread air within the oven chamber.

Specific details of several embodiments of the technology are described below with reference to FIGS. 1A-11. Other details describing well-known structures and systems often associated with coal processing and coke ovens have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1A-11.

Figure 1A:
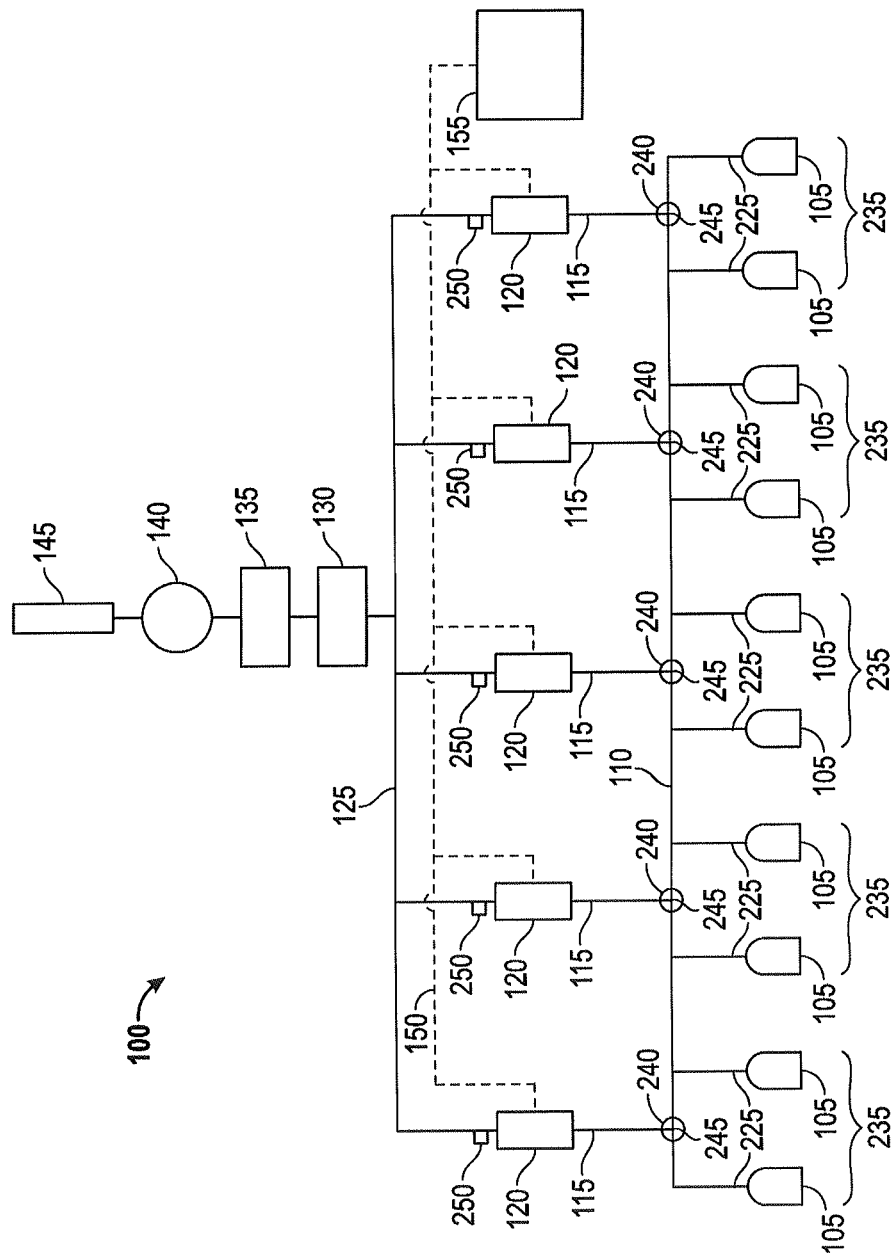
FIG. 1A is a schematic illustration of a horizontal heat recovery coke plant, configured in accordance with embodiments of the technology.

FIG. 1A is a schematic illustration of a horizontal heat recovery (HHR) coke plant 100, configured in accordance with embodiments of the technology. The HHR coke plant 100 comprises ovens 105, along with heat recovery steam generators (HRSGs) 120 and an air quality control system 130 (e.g., an exhaust or flue gas desulfurization (FGD) system), both of which are positioned fluidly downstream from the ovens 105 and both of which are fluidly connected to the ovens 105 by suitable ducts. The HHR coke plant 100 also includes a common tunnel 110 fluidly connecting individual ovens 105 to the HRSGs 120. One or more crossover ducts 115 fluidly connect the common tunnel 110 to the HRSGs 120. A cooled gas duct 125 transports the cooled gas from the HRSGs to the flue gas desulfurization (FGD) system 130. Fluidly connected and further downstream are a baghouse 135 for collecting particulates, at least one draft fan 140 for controlling air pressure within the system, and a main gas stack 145 for exhausting cooled, treated exhaust to the environment. Steam lines 150 can interconnect the HRSG 120 and a cogeneration plant 155 so that the recovered heat can be utilized. Various coke plants 100 can have different proportions of ovens 105, HRSGs 120, and other structures. For example, in some coke plants, each oven 105 illustrated in FIG. 1 can represent ten actual ovens.

As will be described in further detail below, in several embodiments the individual coke ovens 105 can include one or more air inlets configured to allow outside air into the negative pressure oven chamber to combust with the coal's VM. The air inlets can be used with one or more air distributors to direct, preheat, circulate, and/or distribute air within the oven chamber. The term "air" as used herein can include ambient air, oxygen, oxidizers, nitrogen, nitrous oxide, diluents, combustion gases, air mixtures, oxidizer mixtures, flue gas, recycled vent gas, steam, gases having additives, inerts, heat-absorbers, liquid phase materials such as water droplets, multiphase materials such as liquid droplets atomized via a gaseous carrier, aspirated liquid fuels, atomized liquid heptane in a gaseous carrier stream, fuels such as natural gas or hydrogen, cooled gases, other gases, liquids, or solids, or a combination of these materials. In various embodiments, the air inlets and/or distributors can function (i.e., open, close, modify an air distribution pattern, etc.) in response to manual control or automatic advanced control systems. The air inlets and/or air distributors can operate on a dedicated advanced control system or can be controlled by a broader draft control system that adjusts the air inlets and/or air distributors as well as uptake dampers, sole flue dampers, and/or other air distribution pathways within coke oven system. The advanced control systems will be described in further detail below with reference to FIGS. 1B and 1C, and specific embodiments of several air inlets and air distributors will be described in further detail below with reference to FIGS. 2A-11.

Figure 1B:
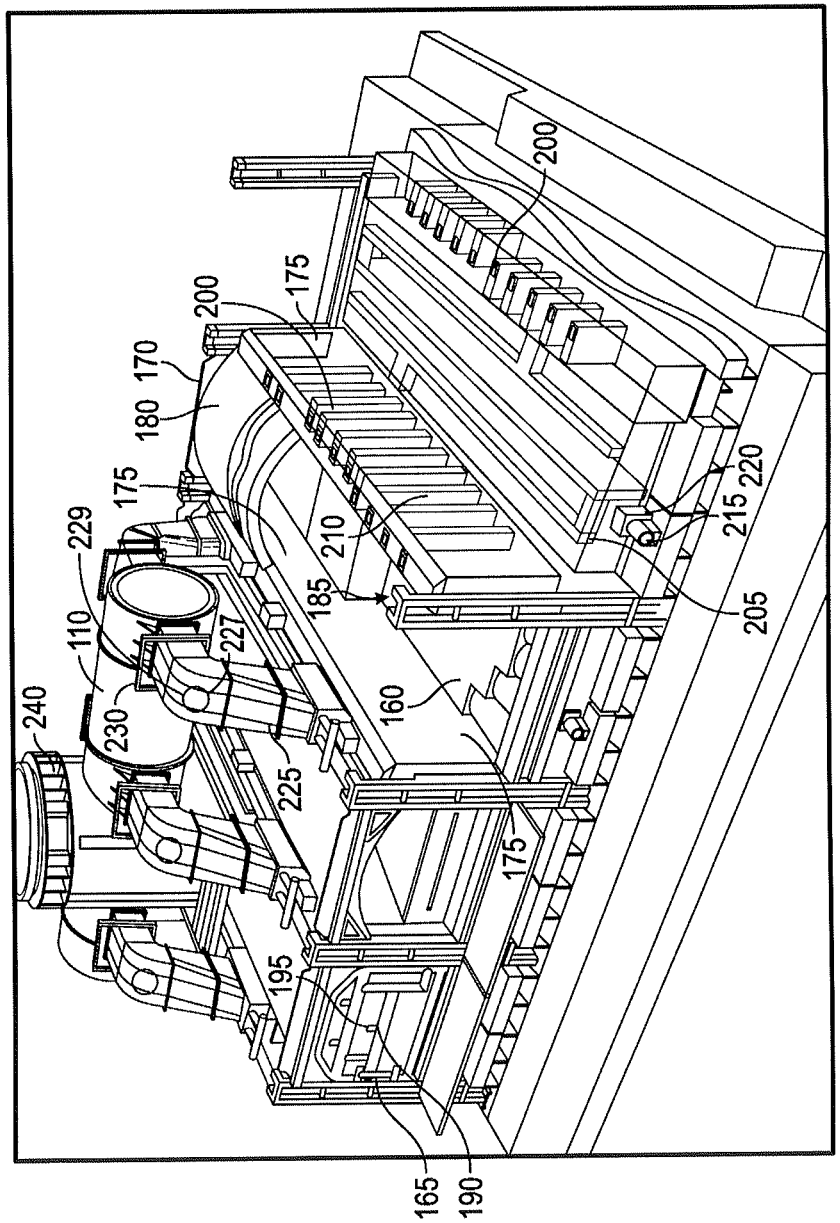
FIG. 1B is an isometric, partial cut-away view of a portion of the horizontal heat recovery coke plant of FIG. 1A configured in accordance with embodiments of the technology.
Figure 1C:
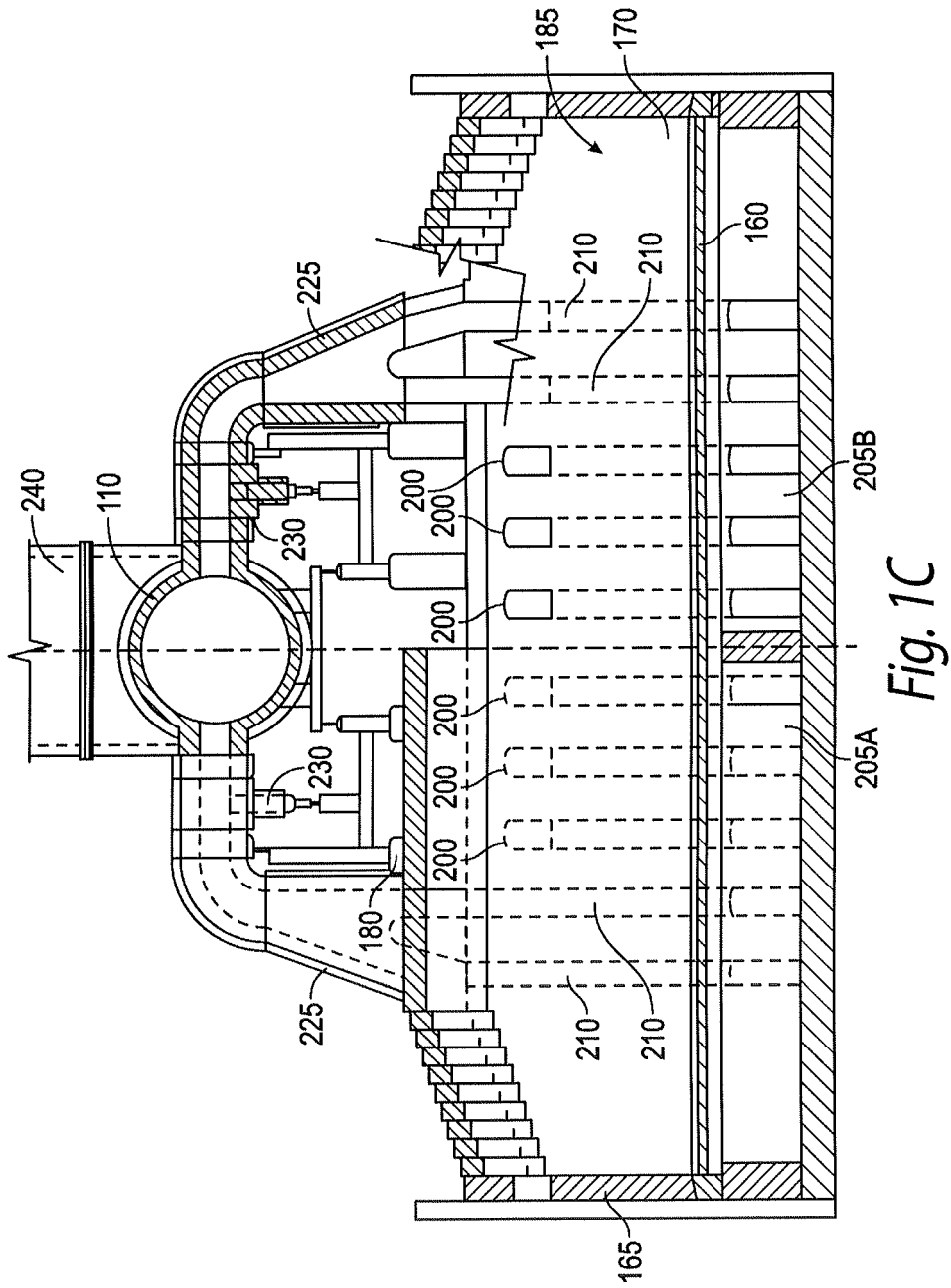
FIG. 1C is a sectional view of a horizontal heat recovery coke oven configured in accordance with embodiments of the technology.

FIGS. 1B and 1C illustrate further details related to the structure and mechanics of coke ovens and advanced control systems in coke ovens. FIG. 1B is an isometric, partial cutaway view of a portion of the HHR coke plant configured in accordance with embodiments of the technology. FIG. 1C is a sectional view of an HHR coke oven 105 configured in accordance with embodiments of the technology. Referring to FIGS. 1B and 1C together, each oven 105 can include an open cavity defined by a floor 160, a front door 165 forming substantially the entirety of one side of the oven, a rear door 170 opposite the front door 165 forming substantially the entirety of the side of the oven opposite the front door, two sidewalls 175 extending upwardly from the floor 160 intermediate the front 165 and rear 170 doors, and a crown 180 which forms the top surface of the open cavity of an oven chamber 185. In various embodiments, the front or rear doors 165, 170 can be full or half-doors. Controlling air flow and pressure inside the oven chamber 185 can be critical to the efficient operation of the coking cycle and therefore the front door 165 includes one or more primary air inlets 195 that allow primary combustion air into the oven chamber 185. In some embodiments, multiple air inlets 195 are interconnected (e.g., via a ceramic tube or other distribution system internal or external to the oven 105) such that air is supplied to each inlet 195 from the common tube. Each primary air inlet 195 includes a primary air damper 190 which can be positioned at any of a number of positions between fully open and fully closed to vary the amount of primary air flow into the oven chamber 185. In some embodiments, the damper 190 can utilize a slide or a twist top control. Alternatively, the one or more primary air inlets 195 are additionally or alternately formed through the crown 180, floor 160, sidewalls 175, and/or other location (above, at, or below the coal bed) within the oven. As will be described in detail below, one or more air distributors can be employed in connection with a primary air inlet 195 to direct, preheat, and/or distribute air within the oven chamber 185.

In operation, volatile gases emitted from the coal positioned inside the oven chamber 185 collect in the crown and are drawn downstream in the overall system into downcomer channels 200 formed in one or both sidewalls 175. The downcomer channels fluidly connect the oven chamber 185 with a sole flue 205 positioned beneath the over floor 160. The sole flue 205 forms a circuitous path beneath the oven floor 160. Volatile gases emitted from the coal can be combusted in the sole flue 205 thereby generating heat to support the reduction of coal into coke. The downcomer channels 200 are fluidly connected to chimneys or uptake channels 210 formed in one or both sidewalls 175. A secondary air inlet 215 can be provided between the sole flue 205 and atmosphere, and the secondary air inlet 215 can include a secondary air damper 220 that can be positioned at any of a number of positions between fully open and fully closed to vary the amount of secondary air flow into the sole flue 205. The uptake channels 210 are fluidly connected to the common tunnel 110 by one or more uptake ducts 225. A tertiary air inlet 227 can be provided between the uptake duct 225 and atmosphere. The tertiary air inlet 227 can include a tertiary air damper 229 which can be positioned at any of a number of positions between fully open and fully closed to vary the amount of tertiary air flow into the uptake duct 225.

In order to provide the ability to control gas flow through the uptake ducts 225 and within the ovens 105, each uptake duct 225 also includes an uptake damper 230. The uptake damper 230 can be positioned at any number of positions between fully open and fully closed to vary the amount of oven draft in the oven 105. The uptake damper 230 can comprise any automatic or manually-controlled flow control or orifice blocking device (e.g., any plate, seal, block, etc.). As used herein, "draft" indicates a negative pressure relative to atmosphere. For example a draft of 0.1 inches of water indicates a pressure of 0.1 inches of water below atmospheric pressure. Inches of water is a non-SI unit for pressure and is conventionally used to describe the draft at various locations in a coke plant. In some embodiments, the draft ranges from about 0.12 to about 0.16 inches of water. If a draft is increased or otherwise made larger, the pressure moves further below atmospheric pressure. If a draft is decreased, drops, or is otherwise made smaller or lower, the pressure moves towards atmospheric pressure. By controlling the oven draft with the uptake damper 230, the air flow into the oven 105 from the air inlets 195, 215, 227 as well as air leaks into the oven 105 can be controlled. Typically, as shown in FIG. 1C, an individual oven 105 includes two uptake ducts 225 and two uptake dampers 230, but the use of two uptake ducts and two uptake dampers is not a necessity; a system can be designed to use just one or more than two uptake ducts and two uptake dampers.

A sample HHR coke plant 100 includes a number of ovens 105 that are grouped into oven blocks 235 (shown in FIG. 1A). The illustrated HHR coke plant 100 includes five oven blocks 235 of twenty ovens each, for a total of one hundred ovens. All of the ovens 105 are fluidly connected by at least one uptake duct 225 to the common tunnel 110 which is in turn fluidly connected to each HRSG 120 by a crossover duct 115. Each oven block 235 is associated with a particular crossover duct 115. The exhaust gases from each oven 105 in an oven block 235 flow through the common tunnel 110 to the crossover duct 115 associated with each respective oven block 235. Half of the ovens in an oven block 235 are located on one side of an intersection 245 of the common tunnel 110 and a crossover duct 115 and the other half of the ovens in the oven block 235 are located on the other side of the intersection 245.

A HRSG valve or damper 250 associated with each HRSG 120 (shown in FIG. 1A) is adjustable to control the flow of exhaust gases through the HRSG 120. The HRSG valve 250 can be positioned on the upstream or hot side of the HRSG 120, or can be positioned on the downstream or cold side of the HRSG 120. The HRSG valves 250 are variable to a number of positions between fully opened and fully closed and the flow of exhaust gases through the HRSGs 120 is controlled by adjusting the relative position of the HRSG valves 250.

In operation, coke is produced in the ovens 105 by first loading coal into the oven chamber 185, heating the coal in an oxygen depleted environment, driving off the volatile fraction of coal and then oxidizing the VM within the oven 105 to capture and utilize the heat given off. The coal volatiles are oxidized within the ovens over an extended coking cycle, and release heat to regeneratively drive the carbonization of the coal to coke. The coking cycle begins when the front door 165 is opened and coal is charged onto the oven floor 160. The coal on the oven floor 160 is known as the coal bed. Heat from the oven (due to the previous coking cycle) starts the carbonization cycle. In some embodiments, no additional fuel other than that produced by the coking process is used. Roughly half of the total heat transfer to the coal bed is radiated down onto the top surface of the coal bed from the luminous flame of the coal bed and the radiant oven crown 180. The remaining half of the heat is transferred to the coal bed by conduction from the oven floor 160 which is convectively heated from the volatilization of gases in the sole flue 205. In this way, a carbonization process "wave" of plastic flow of the coal particles and formation of high strength cohesive coke proceeds from both the top and bottom boundaries of the coal bed.

Typically, each oven 105 is operated at negative pressure so air is drawn into the oven during the reduction process due to the pressure differential between the oven 105 and atmosphere. Primary air for combustion is added to the oven chamber 185 to partially oxidize the coal volatiles, but the amount of this primary air is controlled so that only a portion of the volatiles released from the coal are combusted in the oven chamber 185, thereby releasing only a fraction of their enthalpy of combustion within the oven chamber 185. The primary air can be introduced into the oven chamber 185 above the coal bed through the primary air inlets 195, with the amount of primary air controlled by the primary air dampers 190. The primary air dampers 190 can also be used to maintain the desired operating temperature inside the oven chamber 185.

The partially combusted gases pass from the oven chamber 185 through the downcomer channels 200 into the sole flue 205 where secondary air is added to the partially combusted gases. The secondary air is introduced through the secondary air inlet 215. The amount of secondary air that is introduced is controlled by the secondary air damper 220. As the secondary air is introduced, the partially combusted gases are more fully combusted in the sole flue 205, thereby extracting the remaining enthalpy of combustion which is conveyed through the oven floor 160 to add heat to the oven chamber 185. The fully or nearly-fully combusted exhaust gases exit the sole flue 205 through the uptake channels 210 and then flow into the uptake duct 225. Tertiary air is added to the exhaust gases via the tertiary air inlet 227, where the amount of tertiary air introduced is controlled by the tertiary air damper 229 so that any remaining fraction of uncombusted gases in the exhaust gases are oxidized downstream of the tertiary air inlet 227. At the end of the coking cycle, the coal has coked out and has carbonized to produce coke. The coke is preferably removed from the oven 105 through the rear door 170 utilizing a mechanical extraction system. Finally, the coke is quenched (e.g., wet or dry quenched) and sized before delivery to a user.

As discussed above, control of the draft in the ovens 105 can be implemented by automated or advanced control systems. An advanced draft control system, for example, can automatically control an uptake damper that can be positioned at any one of a number of positions between fully open and fully closed to vary the amount of oven draft in the oven 105. The automatic uptake damper can be controlled in response to operating conditions (e.g., pressure or draft, temperature, oxygen concentration, gas flow rate, downstream levels of hydrocarbons, water, hydrogen, carbon dioxide, or water to carbon dioxide ratio, etc.) detected by at least one sensor. The automatic control system can include one or more sensors relevant to the operating conditions of the coke plant 100. In some embodiments, an oven draft sensor or oven pressure sensor detects a pressure that is indicative of the oven draft. Referring to FIGS. 1A-1C together, the oven draft sensor can be located in the oven crown 180 or elsewhere in the oven chamber 185. Alternatively, an oven draft sensor can be located at either of the automatic uptake dampers 305, in the sole flue 205, at either oven door 165 or 170, or in the common tunnel 110 near or above the coke oven 105. In one embodiment, the oven draft sensor is located in the top of the oven crown 180. The oven draft sensor can be located flush with the refractory brick lining of the oven crown 180 or could extend into the oven chamber 185 from the oven crown 180. A bypass exhaust stack draft sensor can detect a pressure that is indicative of the draft at the bypass exhaust stack 240 (e.g., at the base of the bypass exhaust stack 240). In some embodiments, a bypass exhaust stack draft sensor is located at the intersection 245. Additional draft sensors can be positioned at other locations in the coke plant 100. For example, a draft sensor in the common tunnel could be used to detect a common tunnel draft indicative of the oven draft in multiple ovens proximate the draft sensor. An intersection draft sensor can detect a pressure that is indicative of the draft at one of the intersections 245.

An oven temperature sensor can detect the oven temperature and can be located in the oven crown 180 or elsewhere in the oven chamber 185. A sole flue temperature sensor can detect the sole flue temperature and is located in the sole flue 205. A common tunnel temperature sensor detects the common tunnel temperature and is located in the common tunnel 110. A HRSG inlet temperature sensor can detect the HRSG inlet temperature and can be located at or near the inlet of the HRSG 120. Additional temperature or pressure sensors can be positioned at other locations in the coke plant 100.

An uptake duct oxygen sensor is positioned to detect the oxygen concentration of the exhaust gases in the uptake duct 225. An HRSG inlet oxygen sensor can be positioned to detect the oxygen concentration of the exhaust gases at the inlet of the HRSG 120. A main stack oxygen sensor can be positioned to detect the oxygen concentration of the exhaust gases in the main stack 145 and additional oxygen sensors can be positioned at other locations in the coke plant 100 to provide information on the relative oxygen concentration at various locations in the system.

A flow sensor can detect the gas flow rate of the exhaust gases. For example, a flow sensor can be located downstream of each of the HRSGs 120 to detect the flow rate of the exhaust gases exiting each HRSG 120. This information can be used to balance the flow of exhaust gases through each HRSG 120 by adjusting the HRSG dampers 250. Additional flow sensors can be positioned at other locations in the coke plant 100 to provide information on the gas flow rate at various locations in the system. Additionally, one or more draft or pressure sensors, temperature sensors, oxygen sensors, flow sensors, hydrocarbon sensors, and/or other sensors may be used at the air quality control system 130 or other locations downstream of the HRSGs 120. In some embodiments, several sensors or automatic systems are linked to optimize overall coke production and quality and maximize yield. For example, in some systems, one or more of an air inlet 195, an inlet damper 190, a sole flue damper, and/or an oven uptake damper can all be linked (e.g., in communication with a common controller) and set in their respective positions collectively. In this way, the air inlets 195 can be used to adjust the draft as needed to control the amount of air in the oven chamber 185. In further embodiments, other system components can be operated in a complementary manner, or components can be controlled independently.

An actuator can be configured to open and close the various dampers (e.g., uptake dampers 230 or air dampers 190). For example, an actuator can be a linear actuator or a rotational actuator. The actuator can allow the dampers to be infinitely controlled between the fully open and the fully closed positions. In some embodiments, different dampers can be open or closed to different degrees. The actuator can move the dampers amongst these positions in response to the operating condition or operating conditions detected by the sensor or sensors included in an automatic draft control system. The actuator can position the uptake damper 230 based on position instructions received from a controller. The position instructions can be generated in response to the draft, temperature, oxygen concentration, downstream hydrocarbon level, or gas flow rate detected by one or more of the sensors discussed above; control algorithms that include one or more sensor inputs; a pre-set schedule, or other control algorithms. The controller can be a discrete controller associated with a single automatic damper or multiple automatic dampers, a centralized controller (e.g., a distributed control system or a programmable logic control system), or a combination of the two. Accordingly, individual primary air inlets 195 or dampers 190 can be operated individually or in conjunction with other inlets 195 or dampers 190.

The automatic draft control system can, for example, control an automatic uptake damper 230 or air inlet damper 190, 220, or 229 in response to the oven draft detected by an oven draft sensor. The oven draft sensor can detect the oven draft and output a signal indicative of the oven draft to a controller. The controller can generate a position instruction in response to this sensor input and the actuator can move the uptake damper 230 or air inlet damper 190, 220, or 229 to the position required by the position instruction. In this way, an automatic control system can be used to maintain a targeted oven draft. Similarly, an automatic draft control system can control automatic uptake dampers, inlet dampers, the HRSG dampers 250, and/or the draft fan 140, as needed, to maintain targeted drafts at other locations within the coke plant 100 (e.g., a targeted intersection draft or a targeted common tunnel draft). The automatic draft control system can be placed into a manual mode to allow for manual adjustment of the automatic uptake dampers, the HRSG dampers, and/or the draft fan 140, as needed. In still further embodiments, an automatic actuator can be used in combination with a manual control to fully open or fully close a flow path. As mentioned above, the air inlets 195 can be positioned in various locations on the oven 105 and can likewise utilize an advanced control system in this same manner. In some embodiments having both crown 180 and door 165 air entry, the inlets can be controlled collectively to drive flow circulation within the chamber 185. In various embodiments, individual ovens 105 are controlled separately, while in further embodiments a series of ovens are controlled together.

Figure 2A:
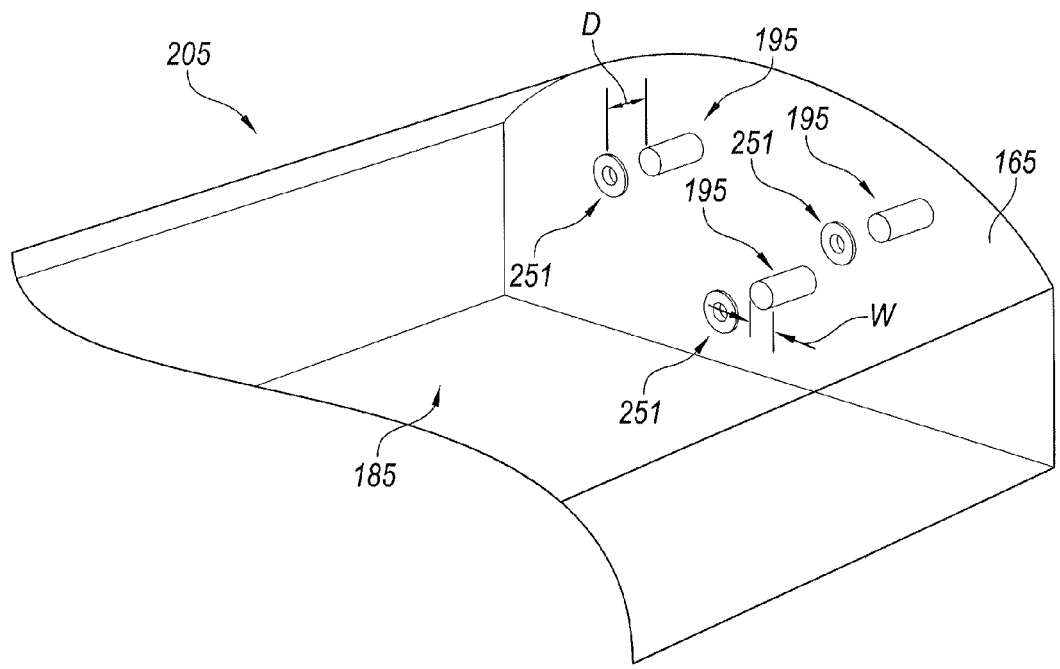
FIG. 2A is an isometric, partially transparent view of a portion of a coke oven having door air distributors configured in accordance with embodiments of the technology.

FIG. 2A is an isometric, partially transparent view of a portion of a coke oven 205 having door baffles or air distributors 251 configured in accordance with embodiments of the technology. As described above with reference to FIGS. 1A-1C, the oven 205 includes a plurality of primary air inlets 195 configured to introduce air into the oven chamber 185. The inlets 195 can be circular, slotted, or other-shaped apertures. The distributors 251 are positioned proximate to the air inlets 195 within the oven chamber 185 and are configured to distribute, preheat, channel, damper, and/or redirect air entering the oven chamber 185. The inlets 195 can have a continuous diameter or width W through the depth D of the oven door 165 or can taper to control pressure. Further, the inlets 195 can be angled with reference to a horizontal axis generally parallel with the oven floor.

Figure 2B:
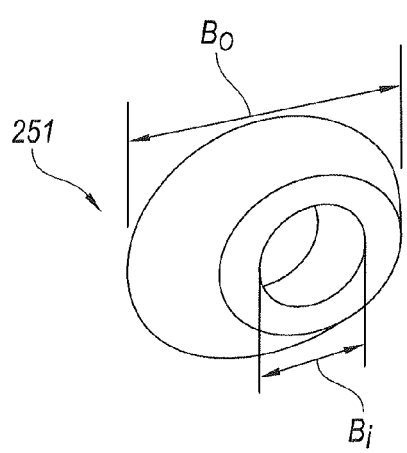
FIG. 2B is an isometric view of a door air distributor configured in accordance with embodiments of the technology.
Figure 2C:
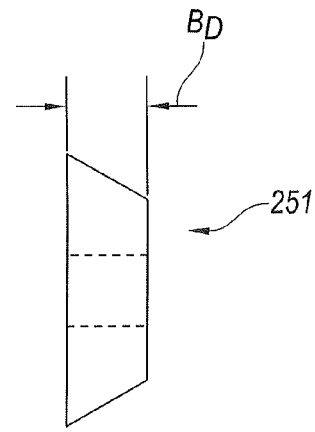
FIG. 2C is a side view of the door air distributor of FIG. 2B configured in accordance with embodiments of the technology.

FIG. 2B is an isometric view of the door air distributor 251 and FIG. 2C is a side view of the door air distributor 251 configured in accordance with embodiments of the technology. Referring to FIGS. 2B and 2C together, the distributor 251 comprises an annulus flow deflecting baffle having an inner diameter $B_i$ and an outer diameter $B_o$ and a depth $B_D$. As shown, in some embodiments $B_o$ is greater than $B_i$ causing the air distributor 251 to have an angled or fanned side profile to expand the distribution profile and disperse incoming air. In some embodiments, the air distributor 251 has an elevation difference from about 1-2 inches over its depth $B_D$. In further embodiments, $B_o$ can be less than $B_i$ in order to narrow the distribution profile or increase pressure on the incoming air to modify the air's distribution profile (e.g., so the air can enter at a higher pressure and extend further into the chamber 185). In further embodiments, the air distributor 251 has a constant diameter. The air distributor's depth $B_D$ can cause the air distributor 251 to extend into the oven chamber 185 to deliver air further towards the center of the chamber 185. In other embodiments, the air distributor 251 can be flush or nearly flush with the oven door 165 or can be. external to the oven chamber 185. While three inlets 195 and distributors 251 are shown, there can be more or fewer in further embodiments of the technology.

Figure 2D:
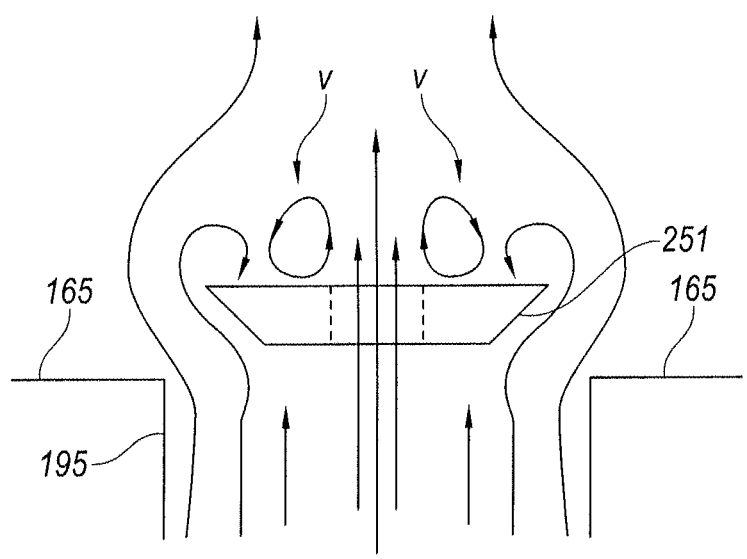
FIG. 2D is a partially schematic, top view of the door air distributor of FIG. 2B forming a vortex air pattern and configured in accordance with embodiments of the technology.

FIG. 2D is a partially schematic, top view of the door air distributor 251 forming a vortex air pattern V and configured in accordance with embodiments of the technology. Referring to FIGS. 2A-2D together, in operation, the distributors 251 spread the air jet entering the oven chamber 185 and prevent the air jet from dipping as close to the coal/coke surface as would an air jet not subjected to an air distributor 251. The distributors 251 accordingly promote combustion before the air hits the coal/coke surface. In some embodiments, the distributor 251 is spaced apart from the oven door 165 and is positioned generally in front of or proximate to the inlet 195. Air entering the oven chamber 185 passes both through and around the distributor 251. The combination of these air flow patterns can create the vortex air pattern V in front of the distributor 251. The distributor 251 can thus be thought of as a vortex generator. The vortex pattern V can cause the air to stall, spin, and in some cases heat before continuing further into the oven chamber. The vortex V can enhance mixing between incoming air and combustion gases and create a flame having some characteristics of a premixed flame. In some cases, the vortex V can anchor a flame to mitigate cold air dipping.

The air entering the oven chamber 185 can also be preheated within the oven door, 165, the air distributors 251, and/or the inlets 195. More specifically, these features can function as heat exchangers, warming incoming air with heat from the oven or other source. In further embodiments, the incoming air is preheated external of the oven 205, such as in a conduit or chamber. In still further embodiments, the air can be preheated within an oven structure (e.g., within a sidewall, crown, door, or floor). In still further embodiments, the air is partially preheated external of the oven chamber 185 and then further heated proximate to the distributor 251 within the chamber 185. In various embodiments, the air entering the chamber 185 can be pressurized, controlled by a broader draft control system as described above, or flow freely or unpressurized. Further, the air can be cold, warm, or hot.

The distributors 251 can reduce yield loss by preventing direct contact between the incoming jet of air and the coal bed. More specifically, the oxygen in the air can be directed toward the crown region to burn the VM released by the coal in the coking process. The distributors can affect the air flow by injecting the air at a location further from the coal/coke surface, redirecting the air stream momentum away from the coal/coke surface, dispersing the air before it reaches the coal/coke surface, preheating the air to lower its density such that it has more time to burn or disperse before reaching the coal/coke surface, or a combination of these techniques. Any of these techniques can provide improved contact between the air and the hot oven gases, providing for faster dispersion/mixing of the oxygen with the oven gases.

Figure 3A:
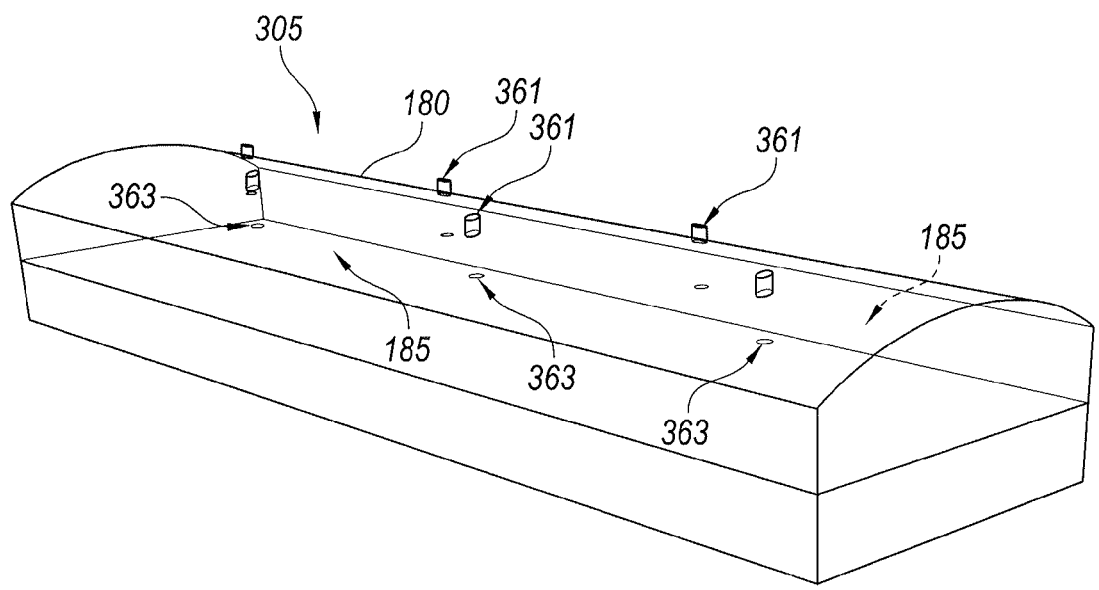
FIG. 3A is an isometric, partially transparent view of a coke oven having crown air distributors configured in accordance with embodiments of the technology.

FIG. 3A is an isometric, partially transparent view of a coke oven 305 having crown air inlets 361 configured in accordance with embodiments of the technology. The crown air inlets 361 can have several features generally similar to the door air inlets 195 described above with reference to FIGS. 1A-2D. For example, the crown air inlets 361 introduce combustion air through the crown 180 and into the oven chamber 185. Each air inlet 361 can include an air damper which can be positioned at any of a number of positions between fully open and fully closed to vary the amount of air flow into the oven chamber 185. The coke oven 305 further includes one or more distributors 363 configured to channel/distribute air flow into the oven chamber 185.

Figure 3B:
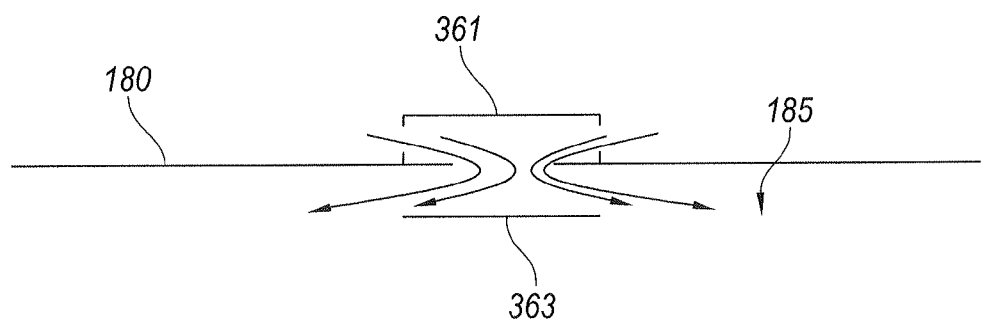
FIG. 3B is a schematic illustration of a crown air distributor configured in accordance with embodiments of the technology.

As shown schematically in FIG. 3B, each distributor 363 comprises a deflection plate or impingement baffle configured to disperse or redirect air entering the oven chamber 185. The distributor 363 can be coupled to the crown 180, inlet 361, or other oven feature. For example, the distributor 363 can be suspended and spaced apart from the crown 180. As air (represented by arrowed flow lines) enters the inlet 361, the air interfaces with and is diverted by the distributor 363. The distributor 363 can accordingly alter the manner in which the air enters and behaves in the oven chamber 185. More specifically, the distributors 363 spread the incoming air laterally and can cause more uniform thermal distribution within the crown and provide better air-VM mixing and combustion in the crown region.

In various embodiments, the distributor 363 can be steel, ceramic, ceramic mesh, or other material suitable for withstanding the high oven temperatures. The distributor 363 can be a solid material or can have one or more apertures therein. While the inlet 361 is shown as having two side apertures to accept air, in further embodiments the inlet 361 can have more or fewer apertures and the apertures can be on the sides or the top of the inlet 361 or can have other suitable arrangements. Similarly, the distributor 363 can allow air flow into the oven chamber 185 via more or fewer than two lateral passageways. Further, the inlet 361 and distributor 363 can have a rectangular, circular, or other shaped cross-section, and the apertures therein can comprise slots, tubes, ports, or any other flow-allowing orifice.

In some embodiments, the inlet 361 and/or distributor 363 can provide preheating of incoming air to lower its density in the manner described above. For example, the inlet 361 can comprise a ceramic or other tube that runs along the top of the oven 305 and receives heat from the oven 305 or other source. In other embodiments, such a heat exchange tube can be inside the oven. In still further embodiments, the inlet 361 can comprise a burner or other heater on the exterior of the oven 305 that heats the incoming air with natural gas or other material. The preheating material can be burned before it reaches the oven or can be introduced to the oven with the air. In further embodiments, an inert gas, combustion gas, dilution gas, or cooling gas can be added to the chamber 185 via the inlet 361 and/or distributor 363. Any of these gases can be introduced manually or as part of an advanced control system in response to a sensed operating condition. In a particular embodiment, for example, fuel can be added during or at the end of a coking cycle in response to a command by the advanced control system. In other embodiments, different materials can be added at different times during the coking cycle. For example, in some embodiments, an inert can be added during the first half of the coking cycle to prevent the influx of oxidizers and create a more purely pyrolytic environment. The inlet 361 and/or distributor 363 can function as a distribution system to supply mixtures of a heating fuel (e.g., natural gas, inert gas, dilution gas) and air to the oven chamber 185. In various embodiments, there can be more or fewer air inlets 361 than shown, and in a particular embodiment there are six inlets 361.

Figure 4:
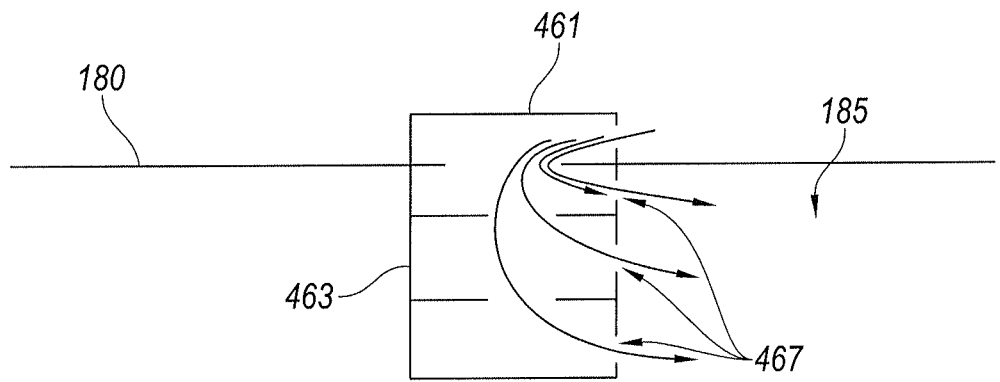
FIG. 4 is a schematic illustration of a crown air distributor configured in accordance with further embodiments of the technology.

FIG. 4 is a schematic illustration of a crown air distributor 463 configured in accordance with further embodiments of the technology. The distributor 463 can comprise a tiered set of baffles channeling air through a plurality of apertures 467. In operation, air enters an air inlet 461 and the distributor 463 spreads the air to a range of depths in the oven chamber 185 and laterally into the crown region. While the illustrated distributor 463 comprises three apertures 467 on only one side, in further embodiments there can be apertures on multiple sides and there can be more of fewer apertures 467 at the same or additional tiers.

Figure 5:
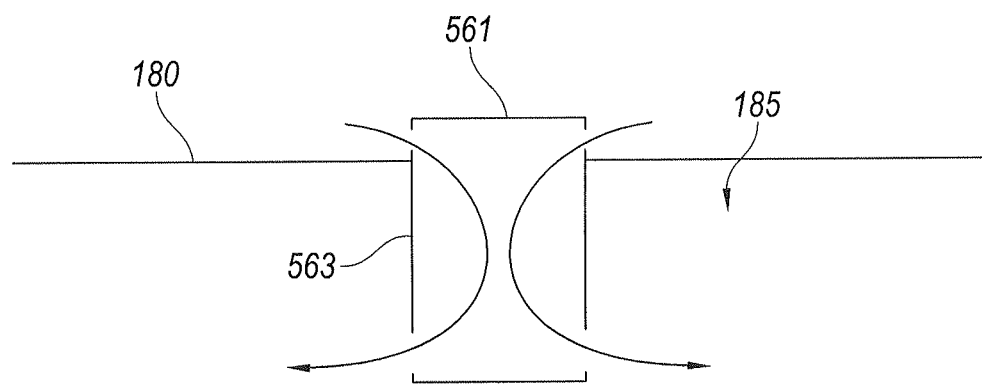
FIG. 5 is a schematic illustration of a crown air distributor configured in accordance with further embodiments of the technology.

FIG. 5 is a schematic illustration of a crown air distributor 563 configured in accordance with further embodiments of the technology. The distributor 563 has several features generally similar to the distributor 363 described above with reference to FIG. 3B. For example, the distributor 563 can be suspended from the crown 180 and can receive air from an air inlet 561. The distributor 563 can be vertically elongated to extend to a further depth in the oven chamber 185. The distributor 563 can accordingly spread air to a region closer to the coal bed and further spaced apart from the crown 180. The elongated distributor 563 can also provide additional air preheating time via heat exchange as described above. In various embodiments, the distributor 563 can have a fixed depth or can have one or more variable baffles, adjustable springs or hinges, or other components to provide for a dynamic depth of distribution of air into the oven chamber 185.

Figure 6:
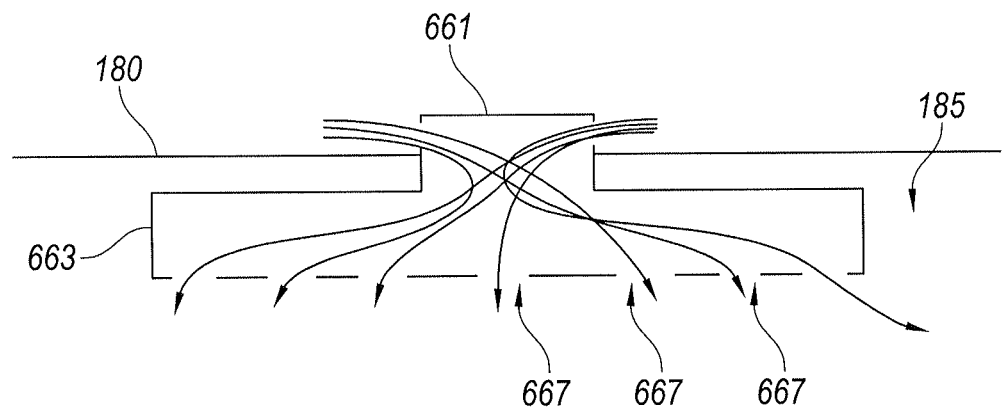
FIG. 6 is a schematic illustration of a crown air distributor configured in accordance with further embodiments of the technology.

FIG. 6 is a schematic illustration of a crown air distributor 663 configured in accordance with further embodiments of the technology. The distributor 663 has several features generally similar to the distributors described above. The distributor 663 can be suspended from the crown 180 and can receive air from an air inlet 661. The distributor 663 can be laterally elongated and have a plurality of apertures 667 on a downward-facing side. In further embodiments, the distributor 663 can be laterally elongated in only one direction and/or can have apertures additionally or alternately on other sides or upward-facing surfaces. The distributor 663 can accordingly spread air laterally and downward and can cause more uniform thermal distribution within the crown 180. By using a laterally elongated distributor having multiple distribution apertures 667, in some embodiments only a few or a single inlet 661 may be needed to provide air to the chamber 185.

Figure 7:
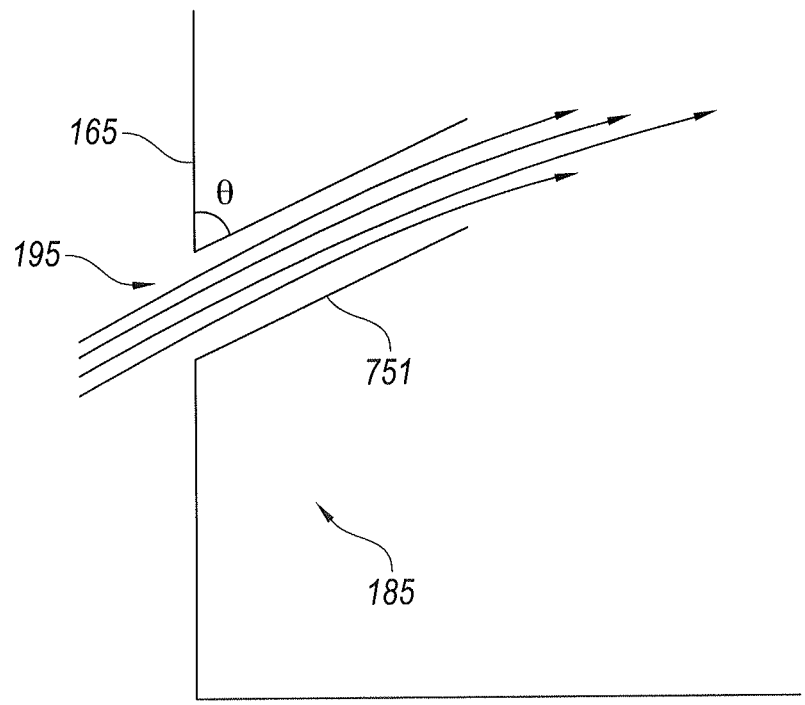
FIG. 7 is a schematic illustration of a door air distributor configured in accordance with further embodiments of the technology.

FIG. 7 is a schematic illustration of a door air distributor 751 configured in accordance with further embodiments of the technology. The distributor 751 is generally cylindrically shaped and extends from and/or through the oven door 165. In some embodiments the distributor 751 extends into the oven chamber 185, while in other embodiments the distributor 751 is flush with the door 165 or a sidewall. The distributor 751 can be angled (e.g., angle θ) with respect to the oven door 165. In further embodiments, the distributor 751 can be more or less angled with respect to the door 165, and can cause air to flow upward, downward, or sideways into the oven chamber 185. In some embodiments, the angle θ is selected to direct cool air sufficiently away from the coal bed to prevent surface burn, but not so steep as to cause burning or other damage to the crown. The distributor 751 can accordingly direct air from the air inlet 195 to a desired location to maximize thermal distribution and VM combustion. In further embodiments, the position of the distributor with respect to the door 165 can be dynamic. For example, the angle θ can change manually or automatically in response to a sensed oven temperature, pressure, oxygen level, or draft condition.

Figure 8:
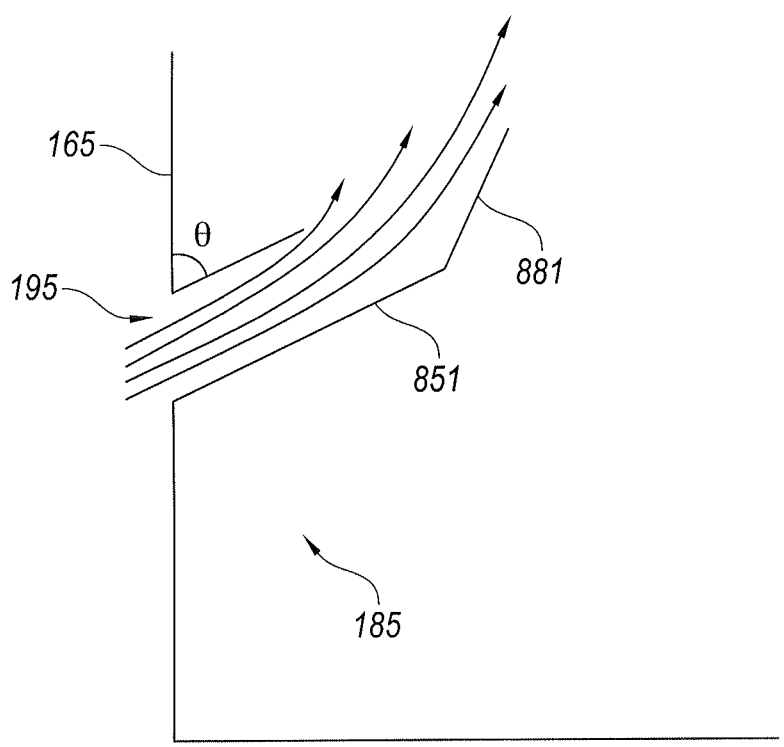
FIG. 8 is a schematic illustration of a door air distributor configured in accordance with further embodiments of the technology.

FIG. 8 is a schematic illustration of a door air distributor 851 configured in accordance with further embodiments of the technology. The distributor 851 is generally similar to the distributor 751 described above with reference to FIG. 7. For example, the distributor 851 can be generally cylindrically-shaped and can extend from the air inlet 195 into the oven chamber 185 and be angled with respect to the oven door 165. Further, the distributor 851 can have a redirection plate 881 at a lateral end configured to redirect the air flow in a given direction. For example, in the illustrated embodiment, the redirection plate 881 forces air flow in an upward direction.

While the redirection plate 881 is illustrated as being coupled to a lower portion of the distributor 851, in further embodiments the redirection plate 881 can be coupled to other portions of the distributor 851, the door 165, or can otherwise be suspended in the oven chamber 185. Further, the connection between the redirection plate 881 and the rest of the distributor can be sharply angled, as shown, or can comprise a smooth contour, and can be static or dynamic.

Figure 9:
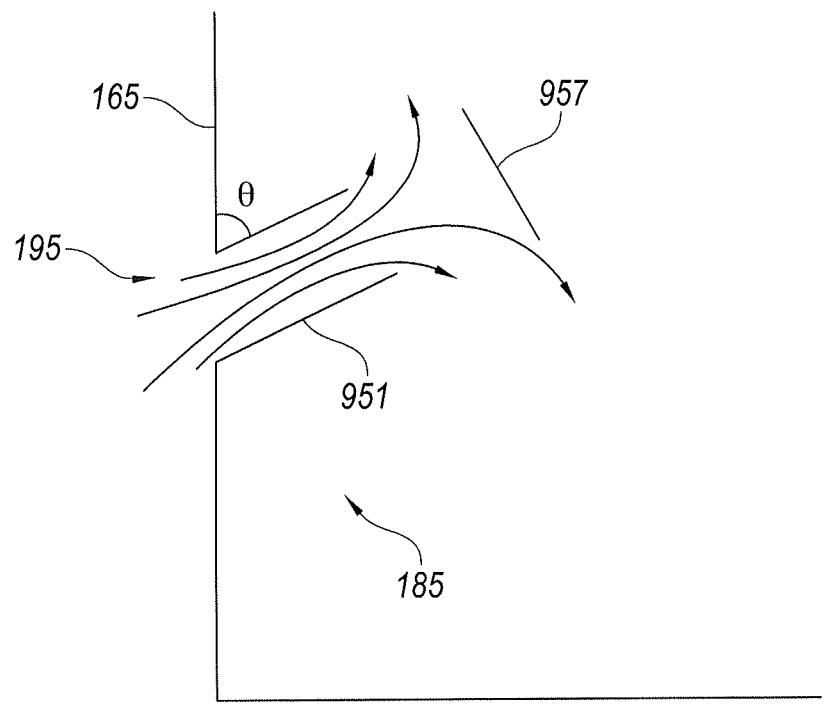
FIG. 9 is a schematic illustration of a door air distributor configured in accordance with further embodiments of the technology.

FIG. 9 is a schematic illustration of a door air distributor 951 configured in accordance with still further embodiments of the technology. The distributor 951 is generally similar to the distributor 851 described above with reference to FIG. 8. For example, the distributor 951 can be generally cylindrically shaped and can extend from the air inlet 195 into the oven chamber 185 and be angled with respect to the oven door 165. Further, a redirection plate 957 can be spaced apart from the distributor 951 and configured to channel or redirect air flow into the oven chamber 185. The redirection plate 957 can be coupled to the distributor 951 or can be otherwise coupled to or suspended in the oven chamber 185. The angle of the redirection plate 957 with respect to the door 165 and distributor 951 can control the airflow distribution pattern in the chamber 185. In the illustrated embodiment, for example, the redirection plate 957 is positioned generally orthogonal to the pattern of air flow through the distributor 951. The air flow therefore interfaces with the redirection plate 957 and is channeled upward toward the crown and downward toward the coal bed. In some embodiments, the redirection plate 957 and/or the distributor 951 can be dynamically angled or otherwise movable with reference to each other.

Figure 10:
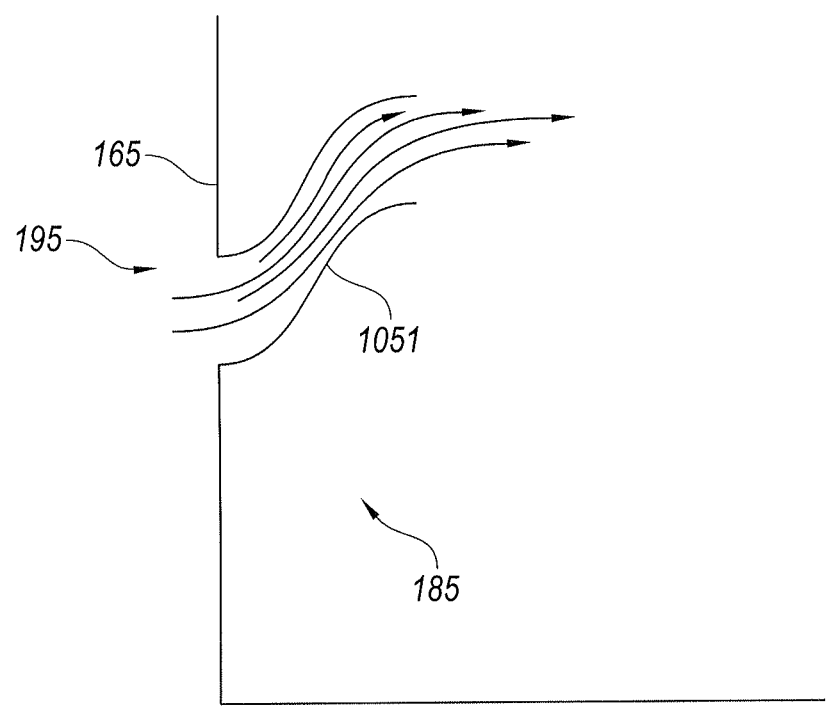
FIG. 10 is a schematic illustration of a door air distributor configured in accordance with further embodiments of the technology.

FIG. 10 is a schematic illustration of a door air distributor 1051 configured in accordance with further embodiments of the technology. The distributor 1051 is generally similar to the distributor 751 described above with reference to FIG. 7. Instead of a generally cylindrical shape, however, the distributor 1051 comprises a curved shape providing a serpentine air flow pathway. While the illustrated embodiments comprises an "S" shape extending inward from the oven door 165 to the chamber 185, in further embodiments the distributor 1051 can have more or fewer curves of various angles. In some embodiments, the curved shape can cause the air entering the oven chamber 185 to spend an extended time in the distributor 1051 as compared to shorter, straighter pathways. The longer residence time in the distributor 1051 can cause the inletting air to be preheated so it does not jet to the coal/coke surface and cause surface burn.

Figure 11:
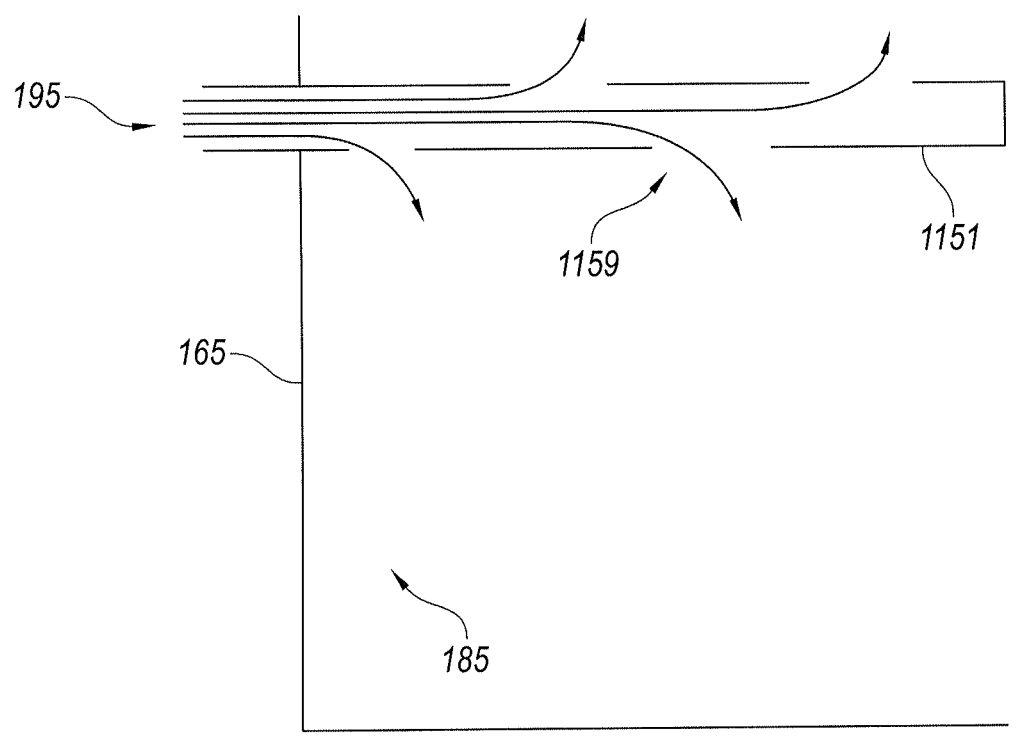
FIG. 11 is a schematic illustration of a door air distributor configured in accordance with further embodiments of the technology.

FIG. 11 is a schematic illustration of a door air distributor 1151 configured in accordance with further embodiments of the technology. The distributor 1151 has several features generally similar to the distributors described above. For example, the distributor 1151 can be generally cylindrically shaped and can extend from the air inlet 195 into the oven chamber 185. The distributor 1151 can further include a plurality of apertures 1159 configured to release air at various points above and below the distributor at various distances from the oven door 165. In further embodiments, there can be more or fewer apertures 1159 and the apertures 1159 can be positioned on more or fewer sides of the distributor 1151. Additionally, while the illustrated distributor 1151 is shown to be generally orthogonal to the oven door 165, in further embodiments the distributor 1151 can be angled relative to the door 165.

EXAMPLES

1. A coke oven air distribution system, comprising:
    an oven chamber having an oven floor configured to support a coal bed, a plurality of sidewalls extending upward from the oven floor, and an oven crown covering a top portion of the oven chamber;
    an air inlet positioned above the oven floor and configured to introduce air into the oven chamber; and
    a distributor proximate to the inlet and configured to at least one of preheat, redirect, or disperse air within the oven chamber.

2. The system of example 1 wherein the air inlet comprises an inlet in the oven crown.

3. The system of example 1 wherein the air inlet comprises an inlet in an individual sidewall.

4. The system of example 3 wherein the individual sidewall comprises an oven door.

5. The system of example 1 wherein the distributor comprises a generally cylindrical tube extending into the oven chamber.

6. The system of example 5 wherein the distributor comprises an impingement plate generally orthogonal to the cylindrical tube.

7. The system of example 1 wherein the distributor comprises an annulus flow deflecting baffle.

8. The system of example 1 wherein the distributor comprises an elongated channel having a plurality of apertures therein.

9. The system of example 8 wherein the elongated channel is elongated in a direction generally parallel to the sidewalls.

10. The system of example 8 wherein the elongated channel is elongated in a direction generally parallel to the oven floor.

11. The system of example 1 wherein the distributor comprises a serpentine pathway.

12. The system of example 1 wherein the distributor comprises a pathway angled in a direction away from the oven floor.

13. The system of example 1, further comprising an inlet damper coupled to the inlet and configured to be positioned at any one of a plurality of positions including fully opened and fully closed.

14. The system of example 13, wherein the inlet damper is automatically movable between positions in response to at least one of a draft, oxygen concentration, or temperature condition in the oven.

15. The system of example 1, further comprising at least one of a conduit or a chamber external to the oven chamber and in fluid communication with the air inlet, wherein the conduit or chamber is configured to contain and/or heat air prior to introduction to the oven.

16. The system of example 15 wherein the conduit or chamber is positioned within one or more of the sidewalls, oven floor, or oven crown.

17. A method of controlling air distribution within a coke oven, the method comprising:
  inletting air into an oven chamber, the oven chamber comprising a floor, a crown, and a plurality of sidewalls connecting the floor and the crown, wherein at least one of the sidewalls comprises a door;
  using a distributor to alter a pathway of the air in the chamber; and
  heating the air along the altered pathway.

18. The method of example 17 wherein inletting air into an oven chamber comprises inletting air through at least one of the crown, one of the sidewalls, or the door.

19. The method of example 17 wherein heating the air along the altered pathway comprises utilizing the distributor as a heat exchanger.

20. A coke oven, comprising:
  an oven chamber;
  an air inlet in fluid communication with the oven chamber, the air inlet being configured to supply gas to the oven chamber;
  a distributor coupled to the air inlet and configured to at least one of preheat, redirect, or distribute the gas;
  an inlet damper in fluid communication with at least one of the distributor or the air inlet, the inlet damper being positioned at any one of a plurality of positions including fully opened and fully closed, the inlet damper configured to control an oven draft;
  an actuator configured to alter the position of the inlet damper between the plurality of positions in response to a position instruction; and
  a controller in communication with the actuator and configured to provide the position instruction to the actuator.

21. The coke oven of example 20, wherein the air inlet comprises a plurality of air inlets, each air inlet having an inlet damper and an actuator, and wherein the controller communicates with the plurality of actuators collectively.

22. The coke oven of example 20, wherein the air inlet comprises a plurality of air inlets, each air inlet having an inlet damper and an actuator, and wherein the controller comprises a plurality of controllers, each controller configured to communicate with an individual actuator.

23. The coke oven of claim 20, further comprising an uptake damper in communication with the controller, wherein the controller is configured to control positions of the inlet damper and the uptake damper collectively.

The systems and methods disclosed herein offer several advantages over traditional coke oven systems. The distributors can improve overall coke productivity and enhance VM gas-air combustion characteristics by better distributing air within the oven chamber and/or preheating air before introducing it to the chamber. The improved air distribution reduces coke surface burn loss and increases overall coke yield. This improved coke productivity enables better and "cleaner" combustion and more uniform temperatures in the oven crown. A more uniform temperature within the crown region helps prevent any potential hot-spots on the oven refractory walls, thus minimizing damage and costly repairs to the oven. Further, better distribution in the oven can require fewer inlets, which can enable easier advanced control over oven operation.

From the foregoing it will be appreciated that, although specific embodiments of the technology have been described herein for purposes of illustration, various modifications may be made without deviating from the spirit and scope of the technology. For example, while certain embodiments have been described as being sidewall, door, or crown air inlets/distributors, these inlets/distributors can be placed at any suitable location in the coke oven. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A coke oven air distribution system, comprising:
  an oven chamber having an oven floor configured to support a coal bed, a plurality of sidewalls extending upward from the oven floor, and an oven crown covering a top portion of the oven chamber;
  an air inlet positioned above the oven floor and configured to introduce air into the oven chamber; and
  a distributor having an inlet end portion, in fluid communication with the air inlet, an outlet end portion opposite the inlet end portion, a fluid pathway extending between the inlet end portion and the outlet end portion, an impingement plate generally orthogonal to an axis extending between the inlet end portion and the outlet end portion, and at least one outlet aperture adjacent the impingement plate in fluid communication with the fluid pathway between the inlet end portion and the outlet end portion; the at least one outlet aperture positioned to face away from the oven floor.

2. The system of claim 1 wherein the air inlet comprises an inlet in the oven crown.

3. The system of claim 1 wherein the air inlet comprises an inlet in an individual sidewall.

4. The system of claim 3 wherein the individual sidewall comprises an oven door.

5. The system of claim 1 wherein the distributor comprises a generally cylindrical tube extending into the oven chamber.

6. The system of claim 5 wherein the impingement plate is generally orthogonal to the cylindrical tube.

7. The system of claim 1 wherein the distributor comprises an annulus-shaped flow deflecting baffle.

8. The system of claim 1 wherein the distributor comprises an elongated channel having a plurality of apertures therein.

9. The system of claim 8 wherein the elongated channel is elongated in a direction generally parallel to the sidewalls.

10. The system of claim 8 wherein the elongated channel is elongated in a direction generally parallel to the oven floor.

11. The system of claim 1 wherein the distributor comprises a serpentine pathway.

12. The system of claim 1, further comprising an inlet damper coupled to the inlet and configured to be positioned at any one of a plurality of positions including fully opened and fully closed.

13. The system of claim 12, wherein the inlet damper is automatically movable between positions in response to at least one of a draft, oxygen concentration, or temperature condition in the oven.

14. The system of claim 1, further comprising at least one of a conduit or a chamber external to the oven chamber and in fluid communication with the air inlet, wherein the conduit or chamber is configured to contain and/or heat air prior to introduction to the oven.

15. The system of claim 14 wherein the conduit or chamber is positioned within one or more of the sidewalls, oven floor, or oven crown.

16. A method of controlling air distribution within a coke oven, the method comprising:
inletting air from an air inlet into an oven chamber, the oven chamber comprising a floor, a crown, and a plurality of sidewalls connecting the floor and the crown, wherein at least one of the sidewalls comprises a door;
using a distributor that extends at least partially into the chamber to alter a pathway of the air in the oven chamber; the distributor having an inlet end portion in fluid communication with the air inlet, an outlet end portion opposite the inlet end portion, a fluid pathway extending between the inlet end portion and the outlet end portion, an impingement plate generally orthogonal to an axis extending between the inlet end portion and the outlet end portion, and at least one outlet aperture adjacent the impingement plate in fluid communication with the fluid pathway between the inlet end portion and the outlet end portion; the at least one outlet aperture positioned to face away from the oven floor; and
heating the air along the fluid pathway extending between the inlet end portion and the outlet end portion of the distributor.

17. The method of claim 16 wherein inletting air into an oven chamber comprises inletting air through at least one of the crown, one of the sidewalls, or the door.

18. A coke oven system, comprising:
an oven chamber;
an air inlet in fluid communication with the oven chamber, the air inlet being configured to supply gas to the oven chamber;
a distributor having an inlet end portion, in fluid communication with the air inlet, an outlet end portion opposite the inlet end portion, a fluid pathway extending between the inlet end portion and the outlet end portion, an impingement plate generally orthogonal to an axis extending between the inlet end portion and the outlet end portion, and at least one outlet aperture adjacent the impingement plate in fluid communication with the fluid pathway between the inlet end portion and the outlet end portion; the at least one outlet aperture positioned to face away from an oven floor within the oven chamber;
an inlet damper in fluid communication with at least one of the distributor or the air inlet, the inlet damper being positioned at any one of a plurality of positions including fully opened and fully closed, the inlet damper configured to control an oven draft;
an actuator configured to alter the position of the inlet damper between the plurality of positions in response to a position instruction; and
a controller in communication with the actuator and configured to provide the position instruction to the actuator.

19. The coke oven system of claim 18, wherein the air inlet comprises a plurality of air inlets, each air inlet having an inlet damper and an actuator, and wherein the controller communicates with the plurality of actuators collectively.

20. The coke oven system of claim 18, wherein the air inlet comprises a plurality of air inlets, each air inlet having an inlet damper and an actuator, and wherein the controller comprises a plurality of controllers, each controller configured to communicate with an individual actuator.

21. The coke oven system of claim 18, further comprising an uptake damper, in fluid communication with the oven chamber and positioned such that gases flow from the coke oven toward the uptake damper, in communication with the controller, wherein the controller is configured to control positions of the inlet damper and the uptake damper collectively.

* * * * *